US010724866B2

(12) United States Patent
Takeyama et al.

(10) Patent No.: US 10,724,866 B2
(45) Date of Patent: Jul. 28, 2020

(54) VEHICLE SYSTEM, INFORMATION PROCESSING DEVICE, AND VEHICLE

(71) Applicants: TOYOTA JIDOSHA KABUSHIKI KAISHA, Toyota-shi, Aichi-ken (JP); AISIN AW CO., LTD., Anjo-shi, Aichi-ken (JP)

(72) Inventors: Hiroaki Takeyama, Nisshin (JP); Norihiro Nakamura, Toyokawa (JP); Hideki Kasezawa, Okazaki (JP); Kensuke Takeuchi, Okazaki (JP); Hajime Morikawa, Nagoya (JP); Yoko Sakurai, Toyohashi (JP)

(73) Assignees: TOYOTA JIDOSHA KABUSHIKI KAISHA, Toyota-shi (JP); AISIN AW CO., LTD., Anjo-shi (JP)

( * ) Notice: Subject to any disclaimer, the term of this patent is extended or adjusted under 35 U.S.C. 154(b) by 50 days.

(21) Appl. No.: 16/207,559

(22) Filed: Dec. 3, 2018

(65) Prior Publication Data
US 2019/0178647 A1 Jun. 13, 2019

(30) Foreign Application Priority Data

Dec. 8, 2017 (JP) ................................. 2017-236279

(51) Int. Cl.
*G01C 21/00* (2006.01)
*G01C 21/20* (2006.01)
*H04W 4/44* (2018.01)
*H04W 4/024* (2018.01)

(52) U.S. Cl.
CPC ............ *G01C 21/20* (2013.01); *H04W 4/024* (2018.02); *H04W 4/44* (2018.02)

(58) Field of Classification Search
CPC ......... G01C 21/20; H04W 4/024; H04W 4/44
See application file for complete search history.

(56) References Cited

U.S. PATENT DOCUMENTS

2016/0358471 A1* 12/2016 Hajj .................... G01C 21/3423
2018/0136655 A1* 5/2018 Kim ........................ B60R 25/23
2019/0266644 A1* 8/2019 Cho ....................... H04W 4/023

FOREIGN PATENT DOCUMENTS

JP 2004-280573 A 10/2004

* cited by examiner

*Primary Examiner* — Adam M Alharbi
(74) *Attorney, Agent, or Firm* — Hunton Andrews Kurth LLP (57) ABSTRACT

An information processing device includes a server. The server is configured to receive start information and positional information of a vehicle from the vehicle when the vehicle is started, acquire schedule information on a user's earliest schedule of the vehicle, the schedule information including information of a start time of the schedule and a destination as a place relating to the schedule, calculate an estimated arrival time at which the vehicle arrives at the destination when the vehicle heads for the destination from a position of the vehicle specified by the positional information of the vehicle, based on a current time, determine whether or not a user has started the vehicle to head for the destination according to a difference between the estimated arrival time and the start time of the schedule, and transmit a determination result of the determination to the vehicle.

9 Claims, 4 Drawing Sheets

VEHICLE SYSTEM, INFORMATION PROCESSING DEVICE, AND VEHICLE

INCORPORATION BY REFERENCE

The disclosure of Japanese Patent Application No. 2017-236279 filed on Dec. 8, 2017 including the specification, drawings and abstract is incorporated herein by reference in its entirety.

BACKGROUND

1. Technical Field

The present disclosure relates to a vehicle system, an information processing device, and a vehicle.

2. Description of Related Art

It is needed to confirm a state of a door lock or a home appliance (power on and off or the like) of a user's house when a user goes out. However, when the user realizes an incorrectness of the state of the door lock or the home appliance after the user has already departed from the house for a destination, the user has to return to the house, and thus, it is desirable for the user to grasp a situation of the house at a timing of a departure.

In particular, considering a case where the user heads for the destination using a vehicle, the user may be notified of the state of the door lock, the home appliance, or the like, every time the user starts the vehicle. In the above described method, however, regardless of a confirmation that there is no problem in the door lock or the like at a departure time, information on the door lock or the like is notified again after the departure, even when the user starts the vehicle again due to a reason for stopping by a store or the like. Even in a case where the vehicle is merely started in a garage under some circumstances, the situation of the user's house or the like is notified, and thus there is a possibility that the user feels inconvenienced.

A technique of confirming a user's position and schedule is disclosed in, for example, Japanese Unexamined Patent Application Publication No. 2004-280573 (JP 2004-280573 A) and the like. In a system disclosed in JP 2004-280573 A, a current position of a person going out is acquired based on positional information of a mobile phone, and a destination for which the person going out is currently heading is obtained based on the current position of the person going out. The system acquires an earliest return date and time by calculating a time taken from the current position to the destination and a time taken from the destination to a return point, and registers the earliest return date and time in a database. Accordingly, even in a case where the schedule of the person going out suddenly changes, a scheduled place of a visit, a plan, and the return date and time are automatically updated.

SUMMARY

However, in the system disclosed in JP 2004-280573 A, no particular consideration is given to processing at the user's departure time.

Several aspects of the present disclosure provide a vehicle system, an information processing device, and a vehicle that can suitably perform processing according to a user's departure to a destination.

A first aspect of the present disclosure relates to an information processing device including a server. The server is configured to receive start information and positional information of a vehicle from the vehicle when the vehicle is started, acquire schedule information on a user's earliest schedule of the vehicle, the schedule information including information of a start time of the schedule and a destination as a place relating to the schedule, calculate an estimated arrival time at which the vehicle arrives at the destination when the vehicle heads for the destination from a position of the vehicle specified by the positional information of the vehicle, based on a current time, determine whether or not a user has started the vehicle to head for the destination according to a difference between the estimated arrival time and the start time of the schedule, and transmit a determination result of the determination to the vehicle.

In the information processing device according to the first aspect of the present disclosure, the server may be configured to transmit a message according to the determination result to a predetermined contact point.

In the information processing device according to the first aspect of the present disclosure, the server may be configured to acquire the schedule information from another server according to user information for specifying an owner of the vehicle.

A second aspect of the present disclosure relates to a vehicle including a communication device and an information providing device. The communication device is configured to communicate with a server outside the vehicle, transmit start information and positional information of the vehicle to the server when the vehicle is started, and receive a determination result indicating whether or not a user has started the vehicle to head for a destination, from the server. The information providing device is configured to provide information to the user according to the determination result.

In the vehicle according to the second aspect of the present disclosure, the information providing device may be configured to decide whether or not to provide the information according to the determination result.

In the vehicle according to the second aspect of the present disclosure, the communication device may be configured to acquire a situation of a user's house from the server, and the information providing device may be configured to provide information relating to the situation of the user's house.

A third aspect of the present disclosure relates to a vehicle system including a vehicle and a server outside the vehicle. The vehicle includes a communication device and an information providing device. The communication device is configured to communicate with the server. The information providing device is configured to provide information to a user. The server is configured to receive start information and positional information of the vehicle from the vehicle, acquire schedule information on a user's earliest schedule of the vehicle, the schedule information including information of a start time of the schedule and a destination as a place relating to the schedule, calculate an estimated arrival time at which the vehicle arrives at the destination when the vehicle heads for the destination from a position of the vehicle specified by the positional information of the vehicle, based on the current time, determine whether or not the user has started the vehicle to head for the destination according to a difference between the estimated arrival time and the start time of the schedule, and transmit the determination result of the determination to the communication device of the vehicle. The communication device is configured to transmit the start information and the positional information of the vehicle to the server when the vehicle is started, and receive the determination result from the server. The information providing device is configured to provide the information to the user according to the determination result.

In the vehicle system according to the third aspect of the present disclosure, the information providing device may be configured to decide whether or not to provide the information according to the determination result.

In the vehicle system according to the third aspect of the present disclosure, the communication device may be configured to acquire a situation of a user's house, and the information providing device may be configured to provide information relating to the situation of the user's house.

In the aspects of the present disclosure, a "unit", a "device", or a "system" does not simply mean physical means and also includes a case where a function of the "unit", the "device", or the "system" is realized by software. The function of one "unit", one "device", one "system", or the like may be realized by two or more physical means or devices, functions of two or more "units", "devices", "systems", or the like may be realized by one physical means or device.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, an embodiment of the present disclosure will be described with reference to drawings. However, the embodiment described below is merely an example, and there is no intention to exclude an application of various modifications and techniques not explicitly described below. That is, the present disclosure can be implemented with various modifications without departing from the scope and the spirit of the present disclosure. In the following description of the drawings, the same or similar parts are denoted by the same or similar reference numerals. The drawings are schematic and do not necessarily correspond to actual dimensions, ratios, and the like. The relationships and ratios of dimensions in the drawings may be different from each other.

EMBODIMENT

1 Overall Configuration

Figure 1:
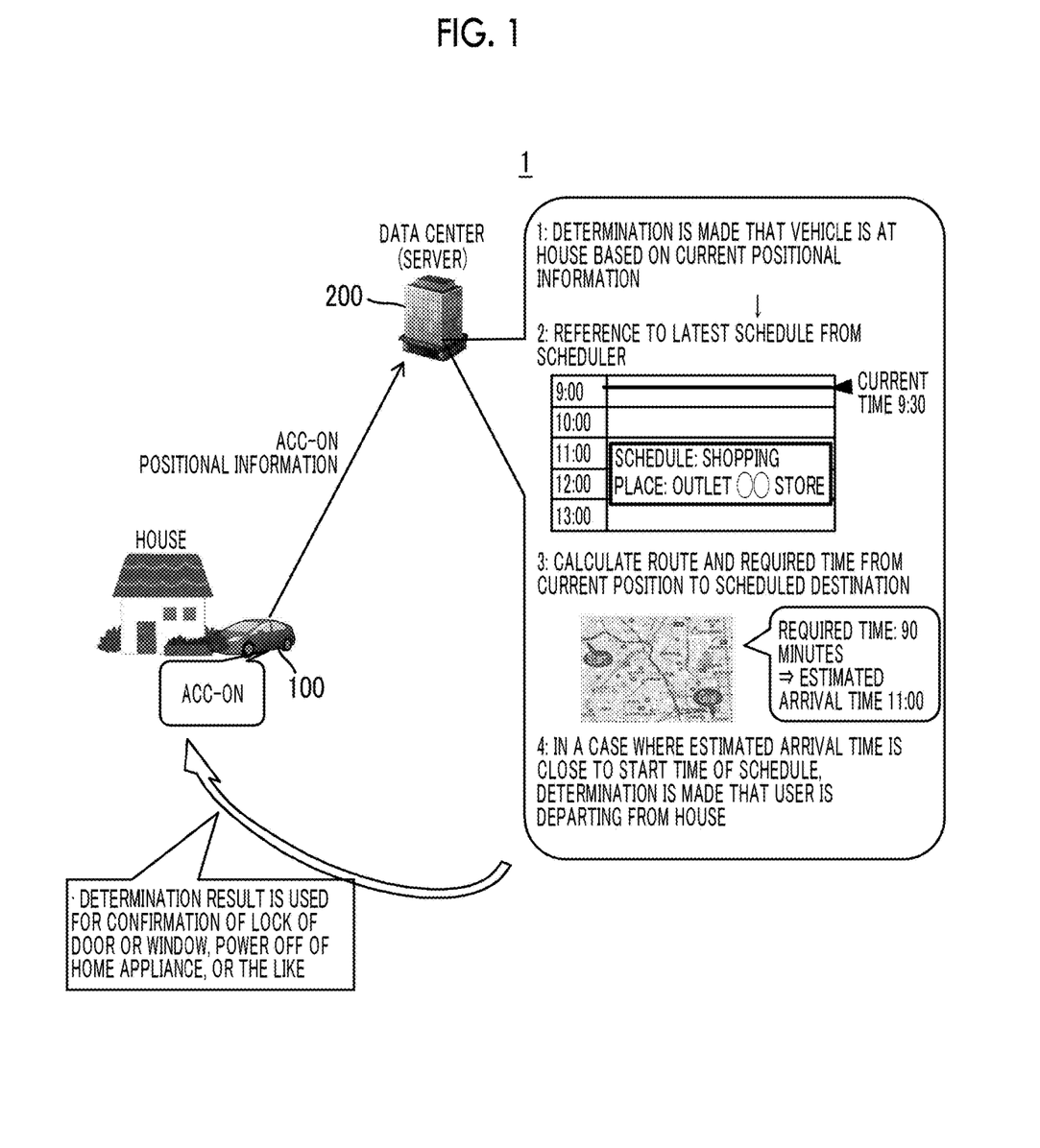
FIG. 1 is a diagram for describing an operation of a vehicle system according to an embodiment.

A functional configuration of a vehicle system 1 according to the embodiment will be described with reference to FIG. 1. The vehicle system 1 includes a vehicle 100 and a server 200 managed by a data center. Although only one vehicle 100 is shown in FIG. 1, the number of the vehicle 100 that can communicate with the server 200 may be numerous. The vehicle 100 is an automobile or the like on which a user gets on, for example, and can mutually communicate with the server 200 via a network such as the Internet or a public telephone network.

The server 200 has functions of receiving positional information, identification information, or the like received from the vehicle 100, determining whether or not the vehicle 100 is departing from a user's house, and notifying the vehicle 100 of a determination result.

Hereinafter, processing of the vehicle system 1 will be briefly described with reference to FIG. 1. When the user of the vehicle 100 starts (ACC-ON) the vehicle 100, the vehicle 100 acquires the positional information of a host vehicle from a global positioning system (GPS) or the like and notifies the server 200 of information to the effect that the vehicle 100 is started, the positional information, and the identification information of the host vehicle or the user's identification information.

Upon receiving the information to the effect that the vehicle is started, the positional information, and the identification information of the host vehicle or the user's identification information from the vehicle 100, the server 200 determines whether or not the positional information of a user's house registered in advance and the positional information received from the vehicle 100 are within a certain range. Accordingly, a determination is made whether or not the vehicle 100 is at the house. In a case where the position of the vehicle 100 is not in a vicinity of the house, it means that the vehicle 100 is not departing from the house for a destination.

When it is possible to determine that the vehicle 100 is at the house, the server 200 acquires a user's earliest schedule information (the information of the schedule) from a scheduler based on the identification information of the vehicle 100 or the user. The schedule information can include information of a start time of the schedule and a venue (the destination). In the example of FIG. 1, current time is 9:30, and shopping at an Outlet Mall OO Store is scheduled past 11 o'clock as the earliest schedule.

The server 200 obtains a required time for the vehicle 100 to arrive at the destination by performing a route search for the vehicle 100 to arrive at the destination registered as the schedule, based on the schedule information and the positional information of the vehicle 100. In a case where the vehicle 100 has departed a current position at the current time, the server 200 obtains an estimated arrival time at which the vehicle 100 arrives at the destination by adding the required time to the current time. For example, in the example of FIG. 1, since the required time from a position of the house to "Outlet Mall OO Store" as the destination is 90 minutes and the current time is 9:30, the estimated arrival time is 11:00.

As a result, the estimated arrival time at which the vehicle 100 immediately after start arrives at the destination is 11 o'clock based on the current time, and the start time of the earliest schedule relating to the destination is past 11 o'clock, and thus, the server 200 can determine that there is a high possibility that the user has started the vehicle 100 in order to depart for the destination. Therefore, the server 200 notifies the vehicle 100 of the determination result to the effect that a purpose of the start of the vehicle 100 is the departure for the destination as departure information.

The vehicle 100 that has received the departure information, which is the determination result to the effect that the purpose of the start is the departure for the destination, receives information on a state of a door lock and a home appliance from an in-house information device capable of collecting information on the door lock or the home appliance inside the house (hereinafter referred to as the "in-house information device"), and displays the information on the state of the door lock or the home appliance on a display device. Accordingly, at a departure time from the house, the user can grasp the information of the door lock or the home appliance. On the other hand, in a case of departing not from the house (for example, in cases of temporary parking on the way to the destination, temporarily starting the vehicle in a garage), the user does not receive the notification of the information of the door lock or the home appliance, and thus it is possible to reduce a reception of troublesome notification of unnecessary information.

2 Functional Configuration

Figure 2:
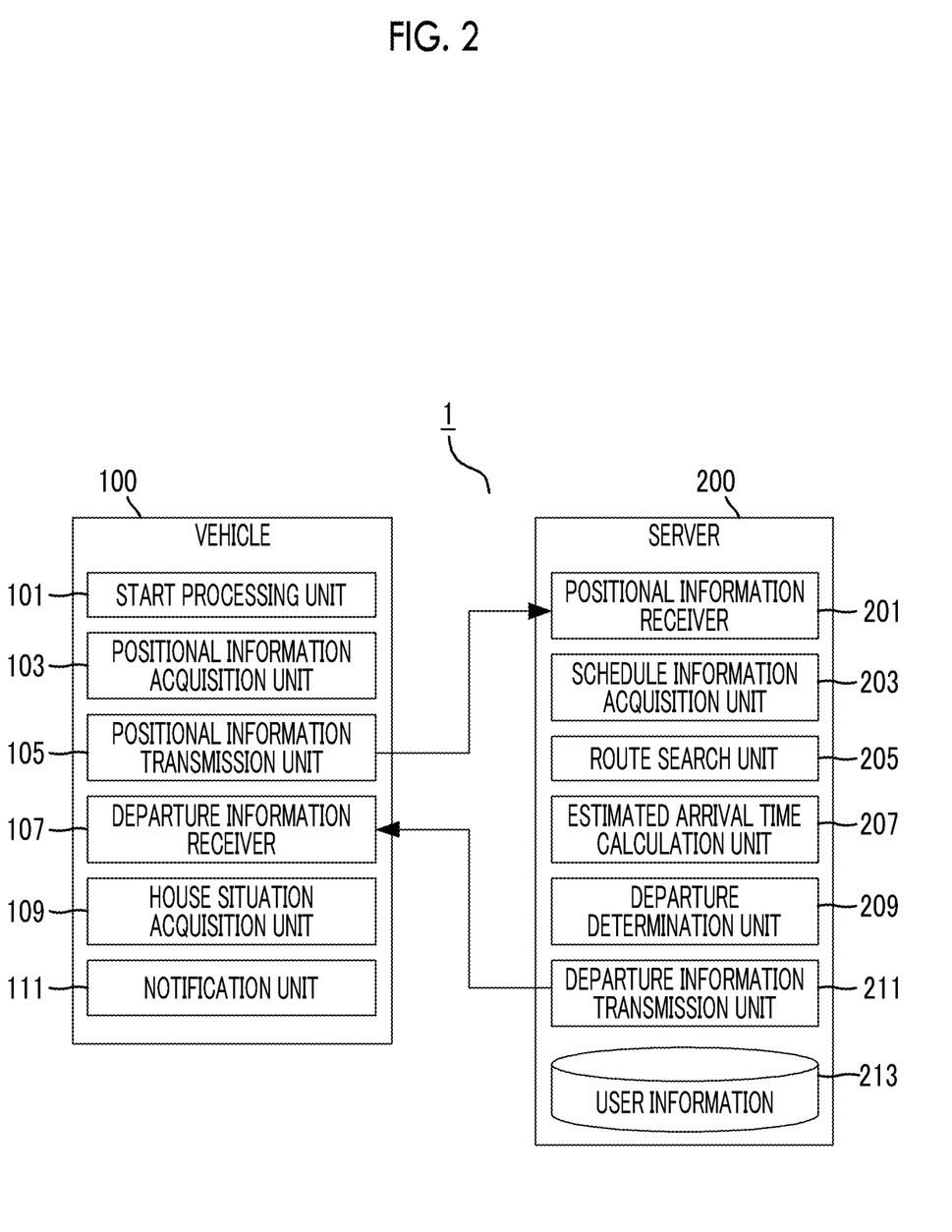
FIG. 2 is a diagram showing a functional configuration of the vehicle system according to the embodiment.

The functional configuration of the vehicle system 1 according to the embodiment will be described with reference to FIG. 2. As described above, the vehicle system 1 includes the vehicle 100 and the server 200. The vehicle 100 and the server 200 can mutually communicate via a network (not shown) such as the Internet or the public telephone network.

2.1 Vehicle 100

The vehicle 100 is the automobile, a motorcycle, or the like used by the user. The vehicle 100 is capable of communicating with the server 200 as described above, and additionally is also capable of communicating with a device (for example, the in-house information device) capable of collecting real-time information on the state of the door lock or the home appliance of the user's house. The vehicle 100 includes a start processing unit 101, a positional information acquisition unit 103, a positional information transmission unit 105, a departure information receiver 107, a house situation acquisition unit 109, and a notification unit 111.

When the user performs a manipulation for the vehicle 100 to be in an energized state (for example, pressing of a power button, key manipulation, and the like), the start processing unit 101 performs start processing in order for the vehicle 100 to be in the energized state.

The positional information acquisition unit 103 receives and acquires the positional information (latitude and longitude information) of the host vehicle by using the GPS, Wi-Fi, or the like. After the vehicle 100 is started, the positional information acquisition unit 103 periodically acquires the positional information for use in a so-called car navigation system or the like. The positional information acquired by the positional information acquisition unit 103 immediately after the vehicle 100 is started is transmitted to the server 200 by the positional information transmission unit 105.

The positional information transmission unit 105 transmits the positional information acquired by the positional information acquisition unit 103 to the server 200 as needed. Immediately after the start (ACC-ON) by the start processing unit 101, the positional information transmission unit 105 transmits the positional information to the server 200 together with the information to the effect that the vehicle is started and the identification information of the vehicle 100 or the user who uses the vehicle 100. The departure information receiver 107 receives, from the server 200, the departure information that is a determination result as to whether or not the vehicle 100 is departing for the destination.

The house situation acquisition unit 109, as needed, acquires the information on a situation of the door lock (whether the door is locked or not) or an operation of the home appliance (for example, whether power supply is on state or off state) of the user's house from the in-house information device, for example. Any method of acquiring the information on the situation of the user's house such as the situation of the door lock or the operation of the home appliance of the house may be used. For example, when each of windows, the doors, the home appliance, or the like at the house can directly communicate with the vehicle 100 via a wireless LAN or the like, the house situation acquisition unit 109 may acquire the information on the situation of the user's house by communicating with each device (the windows, the doors, the home appliance, or the like) individually. Further, for example, in a case where the windows, the doors, and the home appliance at the house are provided to be capable of communicating with the server 200 via the respective networks, the house situation acquisition unit 109 may also acquire the information on the situation of the user's house from the server 200.

When a presumption is made that the vehicle 100 departs for the destination, the notification unit 111 notifies the user of the information on the situation of the user's house acquired by the house situation acquisition unit 109. In other words, in a case where the vehicle 100 is not at the house, or in a case where a presumption is made that the vehicle does not depart for the destination although the vehicle is at the house, the notification unit 111 does not notify the user of the situation of the user's house without an explicit request by the user's manipulation, or the like. Accordingly, it is possible to reduce the notification of the situation of the user's house, which is provided by the notification unit 111, in a case where the user is not in need of the notification.

2.2 Server 200

The server 200 is an information processing device provided to be capable of communicating with one or more vehicles 100. The server 200 includes a positional information receiver 201, a schedule information acquisition unit 203, a route search unit 205, an estimated arrival time calculation unit 207, a departure determination unit 209, a departure information transmission unit 211, and user information 213.

The positional information receiver 201 receives, from the vehicle 100, the information that may include the state of the vehicle 100 (for example, the state immediately after start (ACC-ON)), the positional information relating to the current position of the vehicle 100, and the identification information of the vehicle 100 or the user who uses the vehicle 100. In this case, in a case where a difference of a distance between the position of the house registered in advance in the user information 213 and the received positional information is within the certain range, the positional information receiver 201 can determine that the vehicle 100 is at the house.

The schedule information acquisition unit 203 acquires the earliest schedule information of the user who uses the vehicle 100 from the scheduler based on the current time. The schedule information can include information such as a name of the schedule, the start time and an end time, and a place. For example, in a case where the user uses a scheduler service provided by an external server, information such as an ID and a password for reading the schedule information from the scheduler service may be registered by the user in advance to be managed as a part of the user information 213. In a case where the identification information of the vehicle 100 or the user is received from the vehicle 100, the schedule information acquisition unit 203 may refer to the user information 213 based on the identification information, may log in to the scheduler service using the ID and the password included in the user information 213, and may read the earliest schedule information from the scheduler service. Alternatively, the server 200 may provide the scheduler service. In that case, the schedule information acquisition unit 203 may refer to the schedule information managed as a part of the user information 213.

The route search unit 205 performs the route search based on the information on the departure time, a departure place, and the destination. In this case, the departure time can be the current time, the departure place can correspond to the positional information received from the vehicle 100 (corresponding to the current position of the vehicle 100), the destination can be the place which is included in the schedule information on the earliest schedule and is acquired by the schedule information acquisition unit 203. An actual route search processing itself may be performed by the external server that provides a route search service. In this case, the route search unit 205 can transmit a route search request including the information such as the departure time, the departure place, and the destination to the external server and acquire a route search result as a response to the route search request. The route search result can include information of the required time in addition to the information of the route from the departure place for the destination.

According to the required time acquired by the route search unit 205, the estimated arrival time calculation unit 207 calculates the estimated arrival time in a case where the user departs from the house for the destination using the vehicle based on the current time. For example, the estimated arrival time can be obtained by adding the required time to the current time.

The departure determination unit 209 determines whether or not the vehicle 100 that is started is departing from the house. Specifically, the departure determination unit 209 determines whether or not the positional information acquired by the positional information receiver 201 from the vehicle 100 is within the certain range from the position of the house registered in advance in the user information 213, and in a case where the result is determined not to be within the certain range, it is possible to determine that the vehicle 100 is not departing from the house. The departure determination unit 209 determines whether or not the user who has started the vehicle 100 is departing for the destination based on the estimated arrival time calculated by the estimated arrival time calculation unit 207 and the schedule information acquired by the schedule information acquisition unit 203. Specifically, for example, in a case where the difference between the estimated arrival time and the start time of the schedule included in the schedule information relating to the earliest schedule is within a predetermined range of a threshold such as within 30 minutes, it is possible to determine that the user is departing for the destination.

The departure information transmission unit 211 transmits the determination result of the departure determination unit 209 as to whether or not the user is departing for the destination to the vehicle 100 as departure information. For example, the departure information transmission unit 211 may transmit the departure information, solely in a case where the determination result is that the user is departing.

The departure information transmission unit 211 may also transmit a message of the determination result to users registered in the user information 213. For example, in a case where a user A and a user B are associated with the vehicle 100, and the user A is departing using the vehicle 100, the departure information transmission unit 211 may notify the other user B of the message indicating that the user A is departing using the vehicle 100. As a method of transmitting the message in this case, various messenger applications may be used in addition to an e-mail and an SMS.

The user information 213 is various kinds of information of the user who uses the vehicle 100. The user information 213 can include, for example, the identification information of the vehicle 100 used by the user (vehicle identification information), the identification information assigned for identifying the user (user identification information), and positional information of the house for determining whether or not the vehicle 100 is at the house. In a case where the schedule information acquisition unit 203 refers to an external scheduler, it is possible to include the user ID information and the password information for the scheduler in the user information 213. Alternatively, the schedule information managed by the scheduler may be registered in the user information 213.

3 Processing Flow

Figure 3:
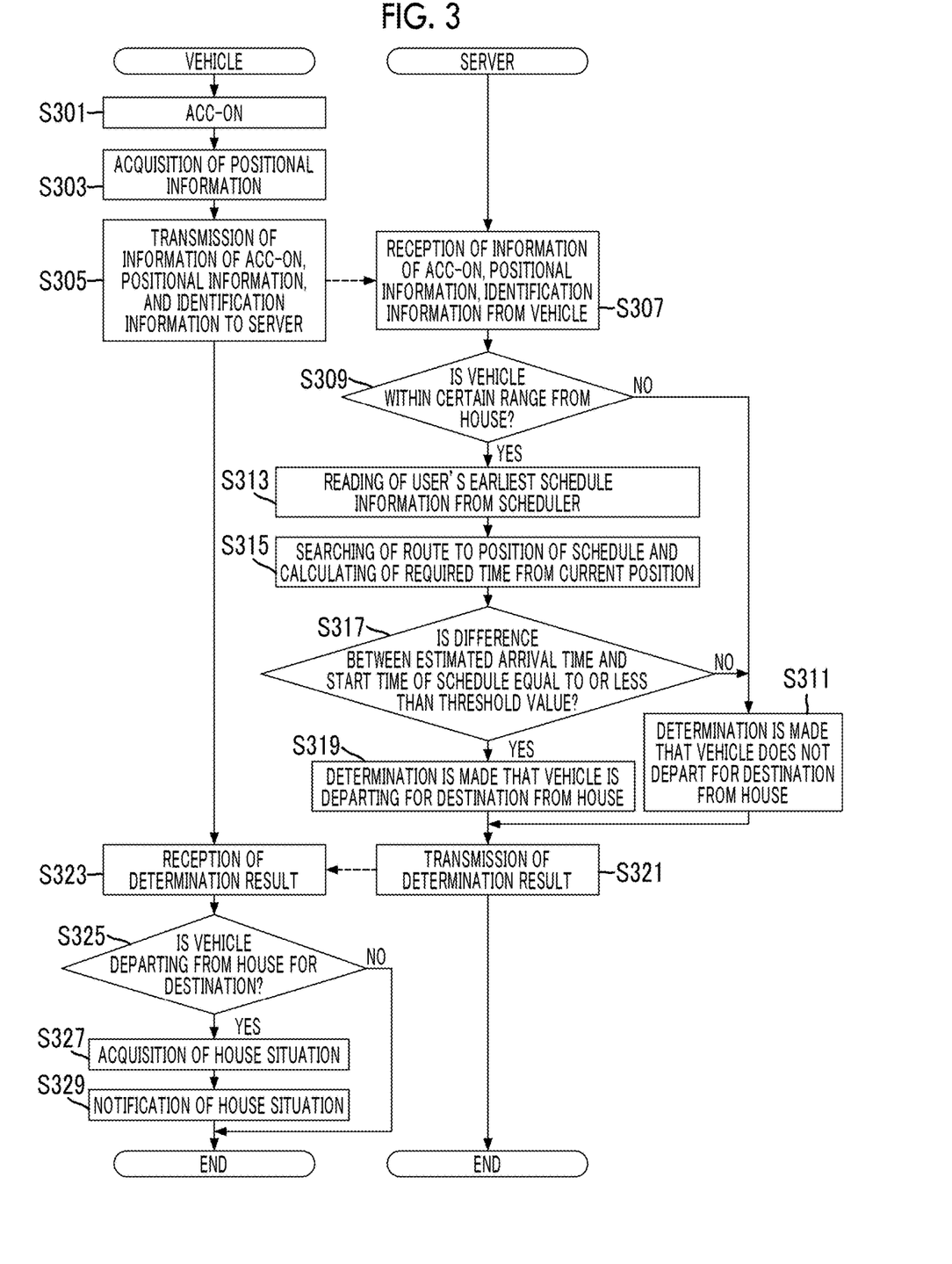
FIG. 3 is a flowchart showing a processing flow of the vehicle system shown in FIG. 2.

Hereinafter, the processing flow of the vehicle system 1 will be described with reference to FIG. 3. FIG. 3 is a flowchart showing the processing flow of the vehicle 100 and the server 200 constituting the vehicle system 1.

In each processing step to be described later, order can be optionally changed and execution in parallel is possible within a range not causing inconsistency in processing contents, and other steps may be added between respective processing steps. A single step for convenience of a description can also be executed by being divided into a plurality of steps, and a plurality of steps divided for the convenience of the description can be also executed as a single step.

The start processing unit 101 performs an energization on each unit needed for the operation of the positional information acquisition unit 103 or the like, and the positional information acquisition unit 103 acquires the positional information indicating the current position of the vehicle 100 (S303) by using GPS or the like when the user starts (ACC-ON) the vehicle 100 (S301). The positional information transmission unit 105 transmits the positional information acquired by the positional information acquisition unit 103, the information of a status (ACC-ON) of the vehicle 100, and the identification information of the vehicle 100 or the user to the server 200 (S305).

When the positional information receiver 201 of the server 200 receives the identification information of the vehicle 100 or the user, the positional information from the vehicle 100, or the like (S307), the positional information receiver 201 determines whether or not the acquired current position of the vehicle 100 is within the certain range from the position of the user's house registered in advance in the user information 213 (S309). In a case where the result is determined not to be within the certain range (No in S309), the departure determination unit 209 determines that the vehicle 100 is not departing from the house for the destination (S311) since it can be considered that the vehicle 100 has departed from a position away from the house.

The schedule information acquisition unit 203 reads the earliest schedule information of the user corresponding to the identification information from the scheduler (S313). As described above, the scheduler may be managed by the server 200 or may be the external scheduler providing the service. The route search unit 205 performs the route search, in a case of the vehicle 100 having departed based on the current time from the position acquired in S307 for the destination as the place relating to the earliest schedule read in S309 (S315). As described above, the specific calculation of the route search may be performed by the route search unit 205, or may be performed by the route search service which the route search unit 205 has the external server provide. As a result, the route search unit 205 can obtain the route and required time when the vehicle 100 heads from the current position for the destination. The estimated arrival time calculation unit 207 calculates the estimated arrival time using the required time and the current time, in a case where the vehicle 100 has departed for the destination based on the current time.

The departure determination unit 209 determines whether or not the difference between the estimated arrival time at the destination and the start time of the schedule at the destination is equal to or less than the threshold value (S317). When the difference is equal to or less than the threshold value (Yes in S317), it is possible to determine that the vehicle 100 is departing from the position of the house for the destination (S319). On the other hand, in a case where the difference between the estimated arrival time at the destination and the start time of the schedule at the destination exceeds the threshold value (No in S317), it is possible to determine that the vehicle 100 is not departing for the destination (S311). The departure information transmission unit 211 transmits the determination result by the departure determination unit 209, that is, the determination result as to whether or not the vehicle 100 that is started is departing for the place relating to the earliest schedule, to the vehicle 100 as the departure information (S321).

The departure information receiver 107 of the vehicle 100 receives the departure information as the determination result as to whether or not the vehicle 100 is departing for the place relating to the earliest schedule (S323). When the vehicle is departing for the place (Yes in S325), the house situation acquisition unit 109 acquires the information relating to the door lock or the operation situation of the home appliance of the house, for example, from the in-house information device (S327), and the notification unit 111 provides the notification of the house situation (S329).

4 Hardware Configuration

Figure 4:
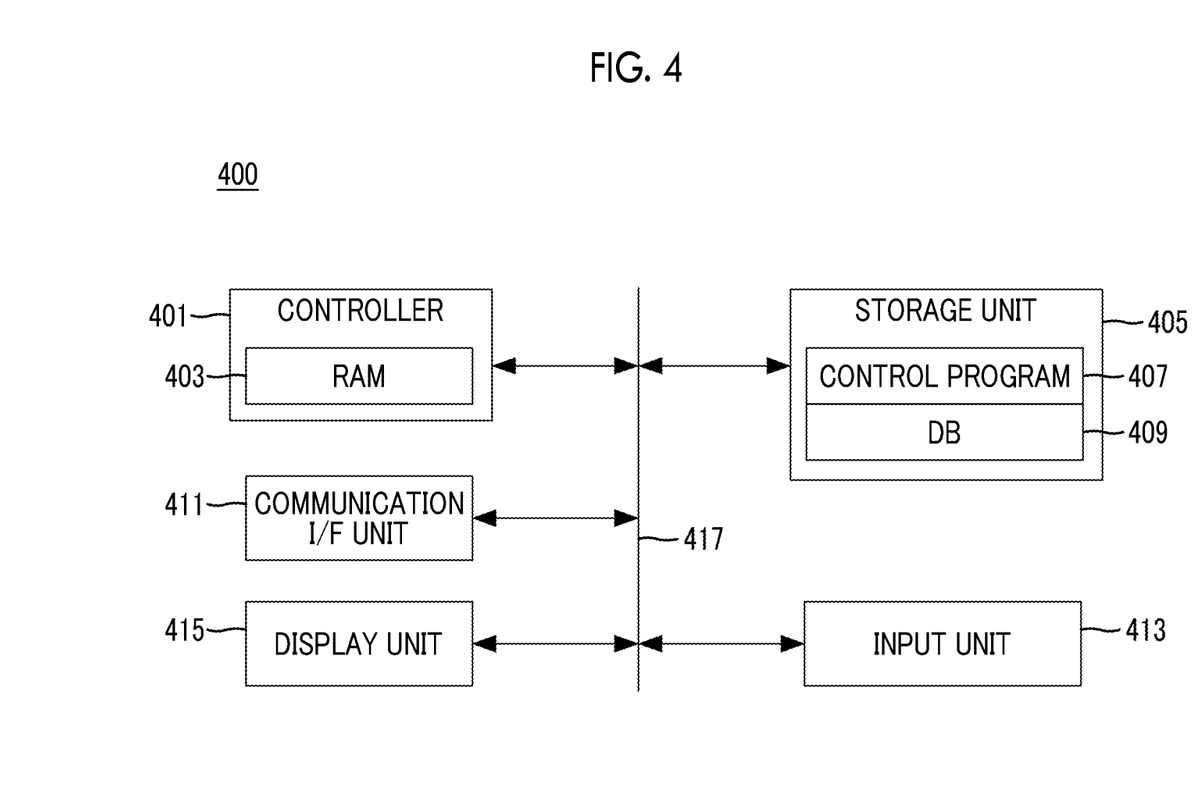
FIG. 4 is a diagram showing a specific example of a hardware configuration capable of realizing a vehicle or a server shown in FIG. 2.

A hardware configuration of a computer 400 that can realize the vehicle 100 and the server 200 will be described with reference to FIG. 4. The computer 400 includes a controller 401, a storage unit 405, a communication interface (I/F) unit 411, an input unit 413, and a display unit 415, and each unit is connected via a bus line 417.

The controller 401 includes a central processing unit (CPU, not shown), a read only memory (ROM, not shown), a random access memory (RAM) 403, and the like. The controller 401 is configured to being capable of executing processing relating to the respective configurations of the vehicle 100 and the server 200 (shown in FIG. 2) in addition to the function of a typical computer by executing a control program 407 stored in the storage unit 405. For example, the start processing unit 101, the positional information acquisition unit 103, the positional information transmission unit 105, the departure information receiver 107, the house situation acquisition unit 109, and the notification unit 111 of the vehicle 100 are temporarily stored in the RAM 403 to be realized using the CPU. The same is applied to the positional information receiver 201, the schedule information acquisition unit 203, the route search unit 205, the estimated arrival time calculation unit 207, the departure determination unit 209, and the departure information transmission unit 211 of the server 200.

The RAM 403 temporarily stores a part or all of codes included in the control program 407 and the pieces of information included in a database (DB) 409. The RAM 403 is also used as a work area when the CPU executes the various processing.

The storage unit 405 is a nonvolatile storage medium such as a hard disk drive (HDD) and a flash memory. The storage unit 405 stores an operating system (OS) for realizing a function as the typical computer and the control program 407 as an application program.

The communication I/F unit 411, as needed, is a device that performs wired or wireless data communication between the vehicle 100, the server 200, the external server that provides the scheduler service, the route search service, the in-house information device, or the like.

The input unit 413 is a device that receives an input manipulation from the user. Specific examples of the input unit 413 can include various buttons, a touch panel, a microphone, or the like.

The display unit 415 is a display device that presents various information to the user manipulating the computer 400. Specific examples of the display unit 415 can include a liquid crystal display, and an organic electro-luminescence (EL) display.

5 Effect of Embodiment

As described above, in the vehicle system 1 according to the embodiment, in a case where the vehicle 100 starts (ACC-ON) and the determination is made that the vehicle 100 is departing for the place registered as the schedule, the user or the like is notified of the information of the house or the like. Accordingly, the user can grasp the situation of the door lock, the operation of the home appliance, or the like before the user actually departs from the house. It is also possible to notify user's family members that the user is departing. It is also possible to reduce the notification of the information of less necessity to the user except the departure time from the house to the destination.

6 Appendix

The above-described embodiment is intended to facilitate understanding of the present disclosure and is not intended to limit an applicable embodiment of the present disclosure. Each element of the embodiment, a disposition thereof, a material, a condition, a shape, a size, and the like are not limited to those exemplified and can be appropriately changed. It is possible to partially substitute or combine the configurations shown in different embodiments.

What is claimed is:

1. An information processing device comprising a server configured to
receive start information and positional information of a vehicle from the vehicle when the vehicle is started,
acquire schedule information on a user's earliest schedule of the vehicle, the schedule information including information of a start time of the schedule and a destination as a place relating to the schedule,
calculate an estimated arrival time at which the vehicle arrives at the destination when the vehicle heads for the destination from a position of the vehicle specified by the positional information of the vehicle, based on a current time, determine whether or not a user has started the vehicle to head for the destination according to a difference between the estimated arrival time and the start time of the schedule, and transmit a determination result of the determination to the vehicle.

2. The information processing device according to claim 1, wherein the server is configured to transmit a message according to the determination result to a predetermined contact point.

3. The information processing device according to claim 1, wherein the server is configured to acquire the schedule information from another server according to user information for specifying an owner of the vehicle.

4. A vehicle comprising:
a communication device configured to
communicate with a server outside the vehicle,
transmit start information and positional information of the vehicle to the server when the vehicle is started, and
receive a determination result indicating whether or not a user has started the vehicle to head for a destination, from the server; and
an information providing device configured to provide information to the user according to the determination result.

5. The vehicle according to claim 4, wherein the information providing device is configured to decide whether or not to provide the information according to the determination result.

6. The vehicle according to claim 4, wherein:
the communication device is configured to acquire a situation of a user's house from the server; and
the information providing device is configured to provide information relating to the situation of the user's house.

7. A vehicle system comprising:
a vehicle; and
a server outside the vehicle, wherein:
the vehicle includes a communication device configured to communicate with the server, and an information providing device configured to provide information to a user;
the server is configured to
receive start information and positional information of the vehicle from the vehicle,
acquire schedule information on a user's earliest schedule of the vehicle, the schedule information including information of a start time of the schedule and a destination as a place relating to the schedule,
calculate an estimated arrival time at which the vehicle arrives at the destination when the vehicle heads for the destination from a position of the vehicle specified by the positional information of the vehicle, based on a current time,
determine whether or not the user has started the vehicle to head for the destination according to a difference between the estimated arrival time and the start time of the schedule, and
transmit a determination result of the determination to the communication device of the vehicle;
the communication device is configured to
transmit the start information and the positional information of the vehicle to the server when the vehicle is started, and
receive the determination result from the server; and
the information providing device is configured to provide the information to the user according to the determination result.

8. The vehicle system according to claim 7, wherein the information providing device is configured to decide whether or not to provide the information according to the determination result.

9. The vehicle system according to claim 7, wherein:
the communication device is configured to acquire a situation of a user's house; and
the information providing device is configured to provide information relating to the situation of the user's house.

* * * * *